Patented Aug. 5, 1930

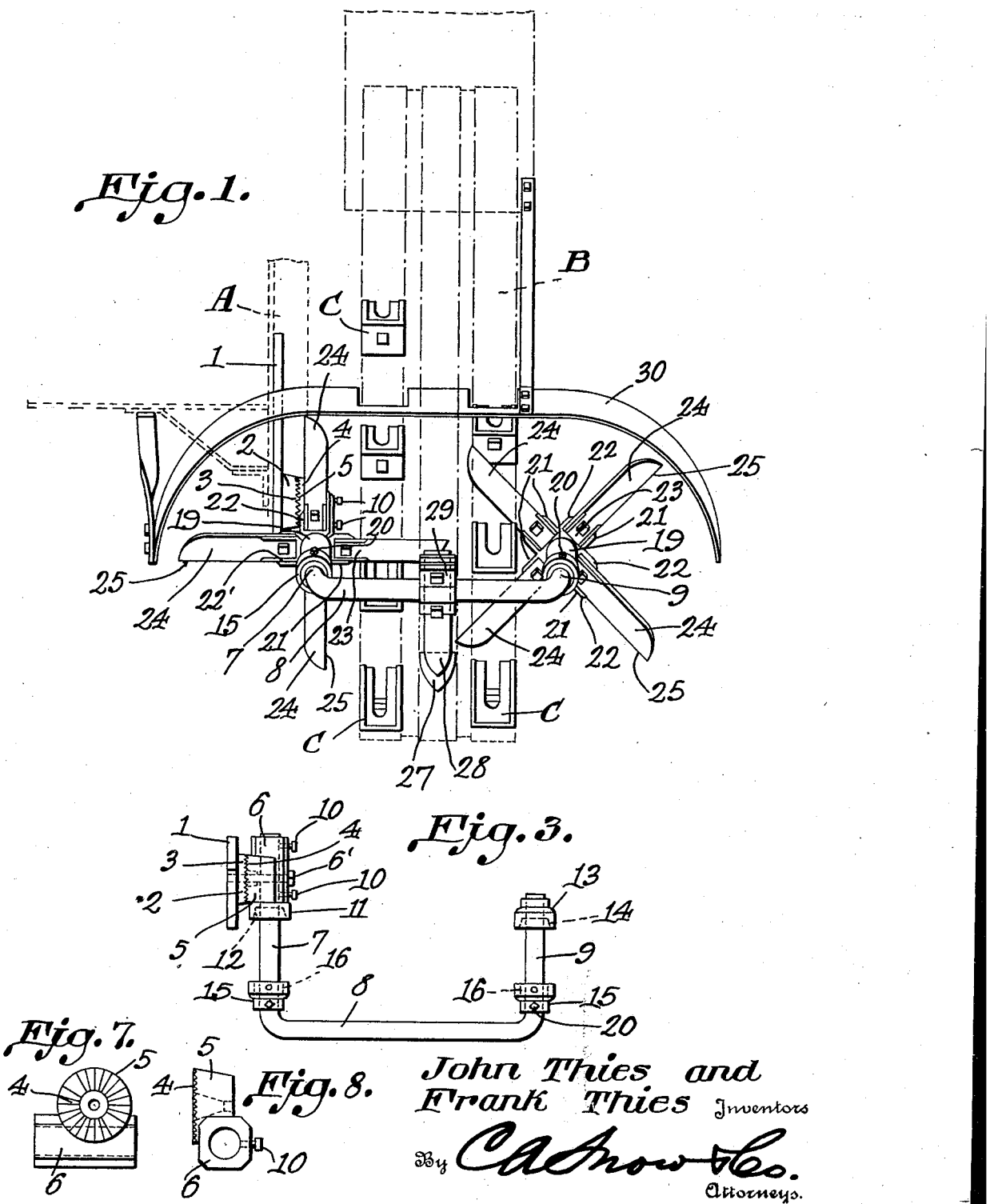

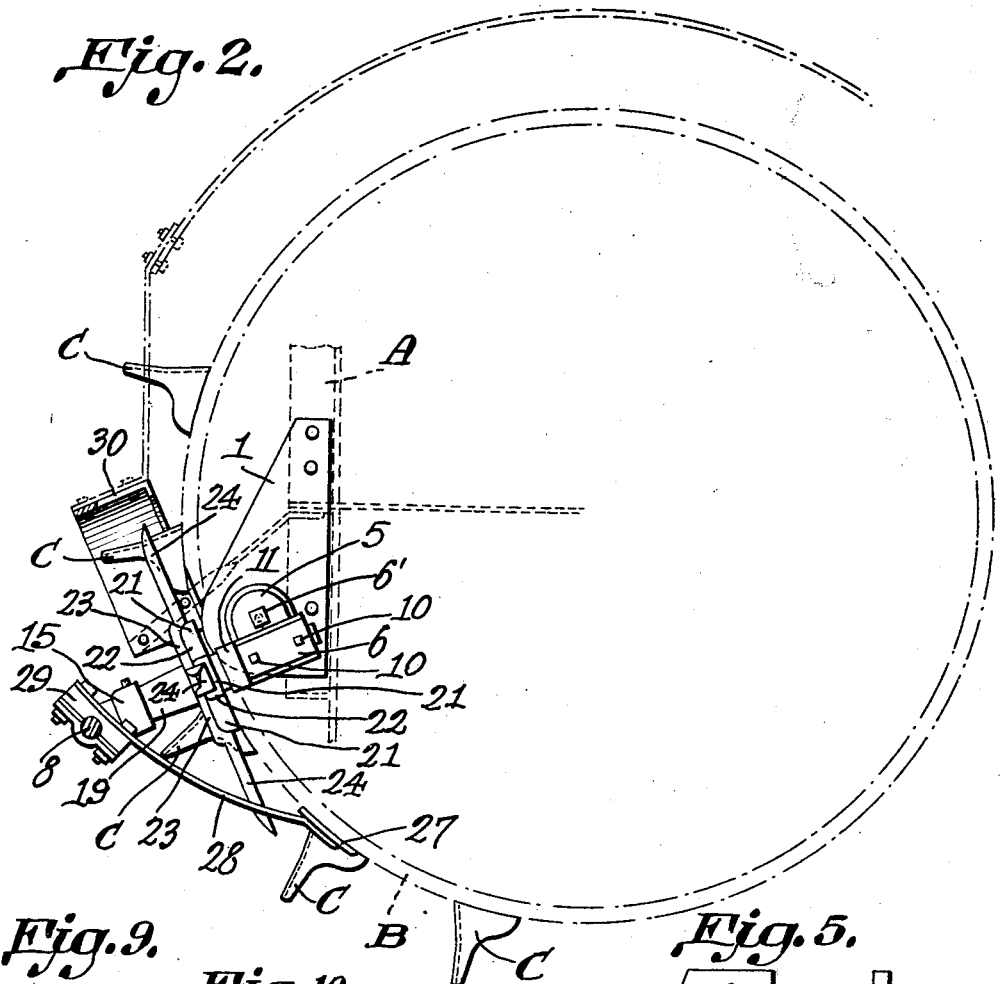
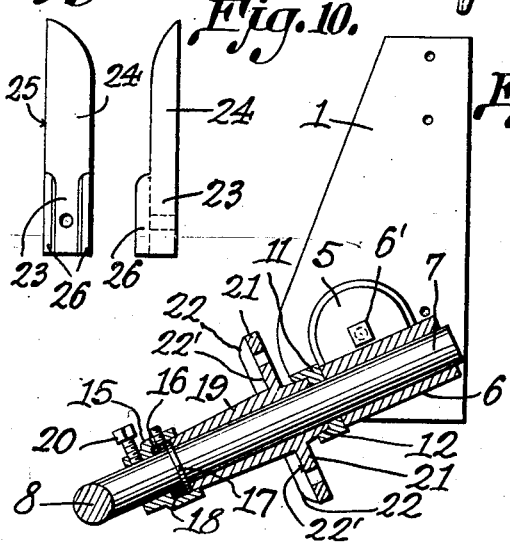
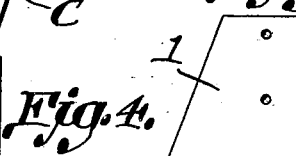
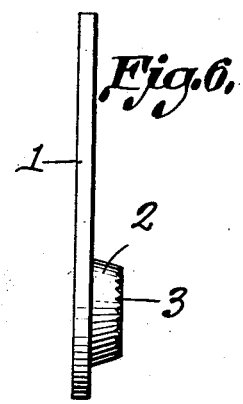
Aug. 5, 1930. J. THIES ET AL 1,772,169
LUG CLEANER FOR TRACTOR WHEELS AND THE LIKE
Filed Jan. 24, 1929   2 Sheets-Sheet 2
John Thies and
Frank Thies  Inventors
By C. A. Snow & Co.
Attorneys.

1,772,169

UNITED STATES PATENT OFFICE

JOHN THIES AND FRANK THIES, OF HUTCHINSON, KANSAS

LUG CLEANER FOR TRACTOR WHEELS AND THE LIKE

Application filed January 24, 1929. Serial No. 334,836.

This invention relates to a cleaner for removing clods of clay and the like from between the lugs of tractor wheels, etc., one of the objects being to provide a simple and efficient device of this character which can be connected readily to a tractor and will be operated by the wheel lugs to cut out accumulations of clay, etc. so that the wheel will be kept practically clean.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a rear elevation of the cleaning device constituting the present invention, the same being shown positioned relative to a tractor wheel and a portion of the tractor frame both of which have been indicated by broken lines, the lugs on the wheel being indicated by full lines.

Figure 2 is a side elevation of the structure shown in Figure 1.

Figure 3 is a plan view of the yoke on which the cleaning blades are adapted to be journaled, the attaching bracket of the yoke being shown.

Figure 4 is a side elevation of the attaching bracket and a portion of the yoke, the hub of one of the sets of cleaning blades being shown in section and the parts cooperating therewith being also shown in section.

Figure 5 is a side elevation of the attaching bracket.

Figure 6 is a rear elevation thereof.

Figure 7 is a side elevation of the yoke engaging sleeve.

Figure 8 is an end elevation thereof.

Figure 9 is a face view of one of the blades.

Figure 10 is a side elevation thereof.

Referring to the figures by characters of reference, A designates a portion of a tractor frame and B designates a tractor wheel. Secured to the periphery of the wheel are spaced annular series of lugs C.

The structure constituting the present invention is designed as an attachment for the tractor whereby dirt packed between the lugs can be removed readily from the wheel. This attachment includes an attaching plate 1 which may be secured in any suitable way to a portion of the frame A and has a boss 2 the face of which has radially disposed teeth 3. Cooperating with this toothed face of the boss is the toothed face 4 of a boss 5 formed on a sleeve 6. A bolt 6' is extended through the centers of the two bosses 5 and 2 and, when tightened, will hold them against relative rotation. Obviously by loosening the bolts the sleeve 6 can be adjusted angularly to any desired position after which it can be held against further rotation by tightening the bolts 6'.

Seated in the sleeve 6 is one arm 7 of a yoke 8, this yoke being formed preferably of a strong metal rod bent to provide, in addition to the arm 7, a shorter arm 9 parallel therewith. One end of the longer arm 7 is gripped in the sleeve 6 by a set screw 10. Thus it is possible to adjust the yoke 8 angularly about the longitudinal axis of arm 7.

Mounted on the arm 7 and bearing against the sleeve 6 is a collar 11 having a tapered counterbore 12. Another collar 13 having a tapered counterbore 14 is mounted on the free end of the arm 9 directly opposite to the collar 11.

A collar 15 having a counterbore 16 is mounted on each of the arms 7 and 9 close to the intermediate portion of the yoke 8. In the counterbore 16 is loosely mounted a thrust washer 17 engaging one end of a coiled spring 18 seated in the counterbore.

Interposed between the collars 11 and 15 on arm 7 is an elongated tubular hub 19 one end of which is tapered and fits within the bore 12 while the other end projects into the bore 16 and is adapted to receive thrust, through the washer 17, from the spring 18. Thus the hub will frictionally bind against the tapered counterbore 12 so as to prevent unrestrained rotation of the hub. The collar 16 is of course moved away from the collar 11 in order to permit assembly of the hub 19 with the collars. Thereafter the collar 15 is adjusted to properly engage hub 19 and is then fastened by means of a set screw 20.

Radial ears 21 are formed on and extended from the hub 19 and each has longitudinal ribs 22 at the side thereof forming a channel 22' therebetween. In each of the channels 22' is seated the butt end 23 of a blade 24 provided with a cutting edge 25. The butt end of the blade can be reinforced by spaced ribs 26. By means of bolts the butt end of the blade can be fastened to the respective ears 21 so that the blades will thus radiate from the hub as shown particularly in Figure 1.

Mounted for rotation on the arm 9 of the yoke is another hub 19 having radiating blades 24, this hub being held between the collars 13 and 15 in the manner already described.

The two arms 7 and 9 are spaced apart such a distance that when the attachment is in position adjacent to a tractor wheel B, one series of blades 24 will work between the lugs C at one side of the wheel while the other series of blades 24 will work between the lugs C at the other side of the wheel. During the rotation of the wheel a lug of one series will come against the back edge of one of the blades 24 and swing it upwardly and laterally out of the path of the lug. This action will cause said blade to cut away any soil that may be packed in front of the lug and at the same time it will cause another blade to come to position behind the first named lug and in front of the next advancing lug. Thus a further cutting action will be set up and as the wheel continues to rotate, the soil packed in front of the second lug will be removed in the same manner as previously described.

The lugs of the other series on the wheel will act in a way similar to that heretofore described upon the second series of blades. Free unrestrained rotation of the blades will be prevented because of the frictional engagement of the hubs 19 with the tapered counterbores in the collars 11 and 13 respectively, the springs 18 serving to maintain this frictional engagement.

If desired a supplemental means may be employed for removing packed soil from between the series of lugs. Such a means can be in the form of a scraping blade 27 connected by a spring arm 28 to a clamp 29 secured to an intermediate portion of the yoke 8 as shown in Figures 1 and 2. This scraping blade will engage the periphery of the wheel B between the two series of lugs C.

A guard plate 30 of any desired contour can be connected in any preferred manner to the frame of the tractor, this plate being adapted to extend over the blades 24 so as to guard against injury to persons adjacent the blades.

What is claimed is:

1. A device of the class described including a yoke having spaced arms, an annular series of radial blades mounted for rotation on each of the arms, means for supporting the yoke in position to straddle the paths of lugs on a tractor wheel, said blades being positioned for successive engagement by the lugs to rotate the blades and remove soil from between the lugs.

2. A device of the class described including a yoke having spaced arms, an annular series of radial blades mounted for rotation on each of the arms, means for supporting the yoke in position to straddle the paths of lugs on a tractor wheel, said blades being positioned for successive engagement by the lugs to rotate the blades and remove soil from between the lugs, and means on each of the arms for retarding the rotation of the blades.

3. The combination with a tractor wheel having peripheral lugs, of a yoke straddling the paths of the lugs, a hub mounted on each end portion of the yoke, blades radiating from each hub positioned for successive engagement by the adjacent lugs thereby to rotate the blade and remove soil from between the lugs, means for supporting the yoke on the frame of the tractor, and means on the yoke for retarding the rotation of the hubs.

4. The combination with a tractor wheel having peripheral lugs, of a yoke straddling the paths of the lugs, a hub mounted on each end portion of the yoke, blades radiating from each hub positioned for successive engagement by the adjacent lugs thereby to rotate the blade and remove soil from between the lugs, means for supporting the yoke on the frame of the tractor, means on the yoke for retarding the rotation of the hubs, said means including spaced collars enclosing the ends of the hubs, an means carried by one of the collars for holding one end of a hub in frictional contact with the other collar.

In testimony that we claim the foregoing as our own, we have hereto affixed our signatures.

JOHN THIES,
FRANK THIES.